Nov. 9, 1971  P. H. KYDD  3,618,319

MAIN COMBUSTION SYSTEM AND COMBUSTION PROCESS

Filed Aug. 2, 1966  4 Sheets-Sheet 1

Inventor:
Paul H. Kydd,
by *Leo J. Ma...*
His Attorney.

Inventor:
Paul H. Kydd, by *Leo J. Ma...*

His Attorney.

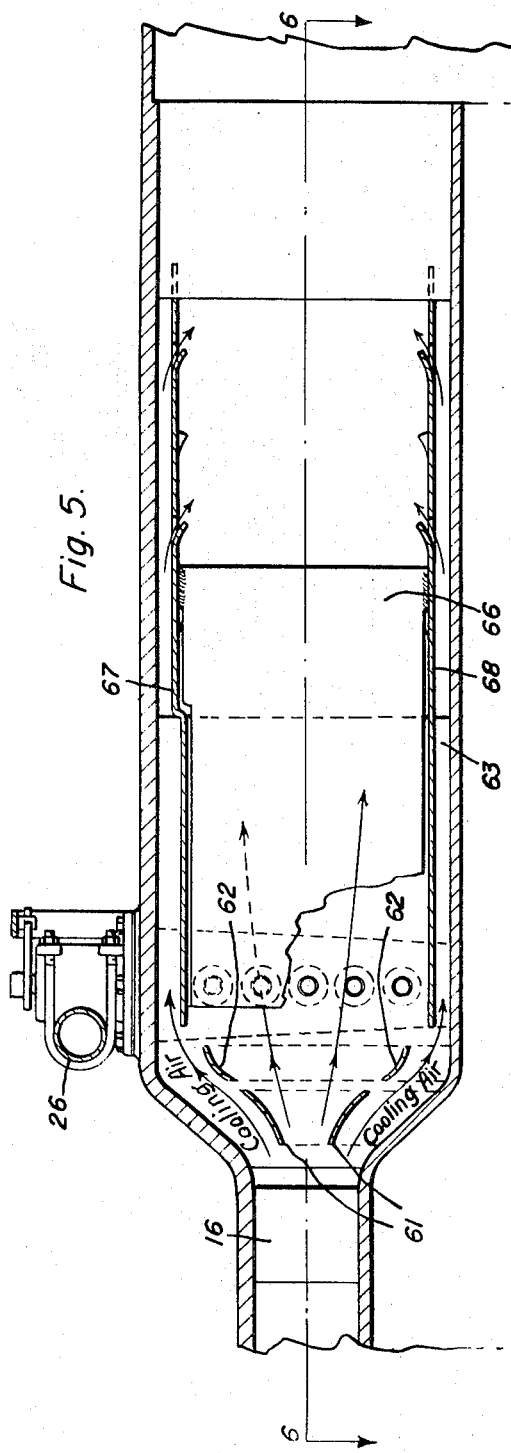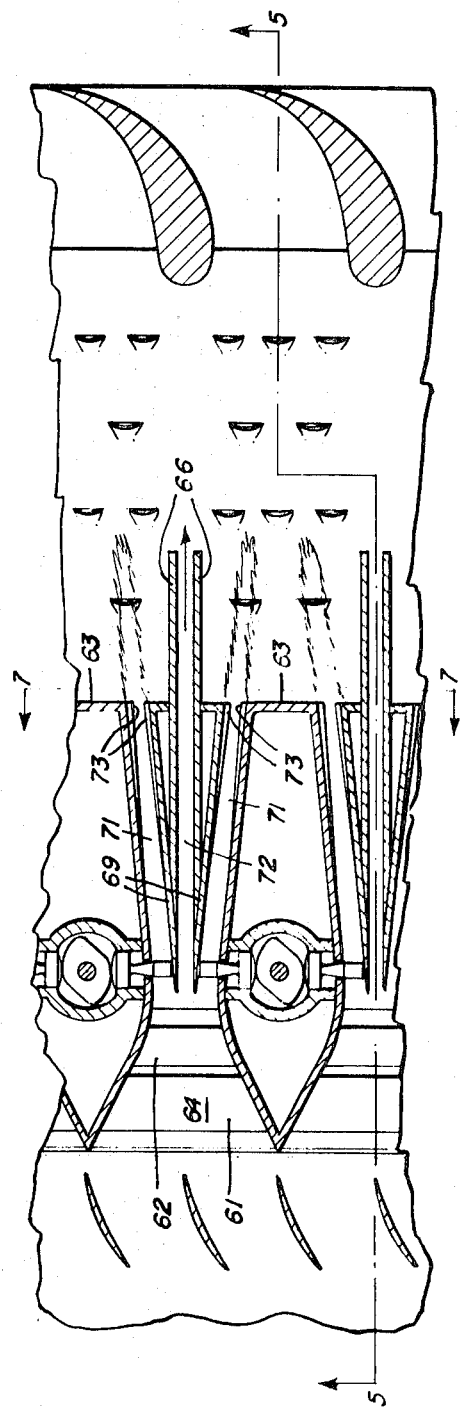

Nov. 9, 1971 P. H. KYDD 3,618,319
MAIN COMBUSTION SYSTEM AND COMBUSTION PROCESS
Filed Aug. 2, 1966 4 Sheets-Sheet 4

Inventor:
Paul H. Kydd,
by *Leo J. MaLossi*
His Attorney.

United States Patent Office 3,618,319
Patented Nov. 9, 1971

3,618,319
MAIN COMBUSTION SYSTEM AND COMBUSTION PROCESS
Paul H. Kydd, Scotia, N.Y., assignor to General Electric Company
Filed Aug. 2, 1966, Ser. No. 569,626
Int. Cl. F02g 3/00
U.S. Cl. 60—39.02    14 Claims

ABSTRACT OF THE DISCLOSURE

Improved construction for the combustion of fuels in a combustion system, as for example a gas turbine, is described wherein means are provided for accurately metering the incoming primary air flow in relation to changes in metered fuel inputs whereby a relatively constant equivalence ratio for the fuel-primary air mixture may be maintained, and wherein secondary air is isolated in ribbon-like radially-directed flows parallel to and interleaved with the primary air-fuel mixture for controlled cooling of the turbine nozzle partitions and/or of the combustion products. The metering means for the primary air flow automatically control the amount of air in the primary air streams in inverse relation to the amount of air in the secondary air streams.

---

This invention relates to apparatus and processes for effecting heat releasing reactions between two or more fluid reactants and has particular, but not exclusive, utility in the primary combustion of fluid hydrocarbon fuels in air, for instance in the main combustion system of a gas turbine power plant.

Present-day direct injection main burners such as the constructions described in U.S. 2,601,000—Nerad, consist of a primary combustion zone into which fuel is sprayed and in which the fuel burns with primary air, which enters through orifices fixed in location and in size. The burned gas containing excess fuel then mixes with secondary air, which enters through another set of fixed orifices located downstream of the primary air orifices, to complete combustion. Still further downstream, more secondary air serves to dilute and cool the combustion products to the allowable turbine inlet temperatures.

In the present-day direct injection main burners it is the practice to maintain a relatively constant ratio of primary to secondary air, while the fuel flow is accurately metered over a range of from less than about ⅛ to ¼ of the overall stoichiometric quantity in traversing from idle to full load. This practice necessarily results in a varying primary equivalence ratio. Equivalance ratio ($\phi$) is defined by the following:

$$\phi = \frac{\text{fuel/air (operating)}}{\text{fuel/air (stoichiometric)}}$$

(fuel/air (stoichiometric) has a value of 0.67 for kerosene, whene the quantities of fuel and air are expressed in terms of weight).

In contrast to the aforementioned, in the practice of this invention means are provided for accurately metering the primary air flow in relation to changing fuel inputs whereby a relatively constant primary equivalence ratio is maintained. By establishing this relatively constant primary equivalence ratio, the range of overall fuel-air ratio now can be extended to as nearly stoichiometric combustion as the cooling air requirements of the combustor and turbine will permit and still avoid loss in either heat release rate or combustion efficiency due to an overly fuel-rich primary zone, as would be the case in a conventional burner.

This invention takes on considerable import, when it is considered that the heat release rate of hydrocarbon flames exhibits a sharp maximum at the stoichiometric fuel-air ratio and that this maximum heat release rate is of the order of about 20 times the volumetric release rate achieved in the direct injection main burners of today. This considerable difference exists, because of the large proportion of the volume of these burners occupied by fuel-air mixtures, which mixtures are in proportions far from the stoichiometric ratio.

Thus, by maintaining a constant, nearly stoichiometric fuel-air ratio over the whole operating range of the power plant, heat release rates approaching the chemical kinetic limit can now be realized and the main combustor volume can be substantially reduced. The reason for these economies in volume (and length) that can be realized with this invention is the elimination from the combustor volume of those mixtures of gases having an equivalence ratio outside the range 0.7–1.3. Such poor mixtures contribute very little to the heat release process and the space occupied thereby in the combustor has been uneconomically employed. Near stoichiometric mixtures also exhibit maximum stability as well as a sharp minimum in the requisite ignition energy. For these reasons, the burning of stoichiometric fuel-air ratio mixtures can occur at higher flow velocities, and a reduced amount of spark energy (one milijoule or less) will still provide optimum flame spreading from the ignition source to the rest of the combustor. Additional benefits inure to the construction of this invention, because mixtures with equivalence ratios leaner than 1.3 do not yield solid carbon upon burning, and thus the radiant heat load on the combustor liner is reduced and exhaust smoke and turbine erosion are eliminated. Although in principle it is merely necessary to employ nearly stoichiometric fuel-air ratios, it is preferable to avoid fuel-rich mixtures altogther and thereby operate with a primary air flow 5 to 15 percent in excess of the stoichiometric amount. Such operation will optimize combustion efficiency and heat release rate as well.

Decreasing the size of the main combustor, particularly a reduction in the length thereof, as is made possible by this invention, requires that the atomization and mixing of the fuel with the primary air be accomplished as thoroughly and rapidly as possible. The energy required for such thorough atomization is considerable, however, sufficient energy for such atomization can be supplied by the primary air stream itself by virtue of its sensible heat at high compression ratios and its high velocity relative to the velocity of the fuel stream. The requisite rapidity of mixing and uniformity of distribution of the atomized fuel in the primary air are achieved by significantly increasing the number of fuel injection points over the number conventionally employed, i.e. about 10 times as many.

Since combustion intensity is determined by the rate of the mixing of the unburned primary fuel-air mixture and burned gas, the combustion intensity can be increased by utilizing the high velocity of the primary mixture (fuel and primary air). Also, by subdividing the streams of primary mixture into many smaller streams to increase the area of contact between burned gas and primary mixture, combustion intensity can be increased. By maintaining a nearly stoichiometric fuel-air ratio, the primary fuel-air mixture can be burned at high intensity with relatively small flame holding surfaces located downstream of the fuel injection points.

The secondary air in present-day combustors is routed around the primary zone and is injected normal to the flow direction, as shown in FIG. 11 of the above-mentioned Nerad patent. In contrast thereto the secondary air in this invention is subdivided into ribbon-like streams interleaved, and parallel, with the primary mixture. This secondary air can then be mixed with the combustion products in a controlled fashion. The capacity is, therefore, provided for rapid, fine-scale mixing to a small or to a large extent over a short distance of travel. The preferred arrangement is one wherein a ribbon-like stream of secondary air enclosed between parallel spaced partitions is delivered substantially intact to the end of the combustion chamber and then spread over the surfaces of the turbine nozzle partitions. A relatively small amount of this secondary air will be used in transit for film cooling of the outer surfaces of the enclosing partitions.

Alternatively, as will be shown herein thorough mixing of secondary air and burned gas can be achieved shortly after entry into the combustion chamber, because of the ribbon-like configuration of the secondary air streams, which provides a very large area of contact with burned gases on each side thereof. This very large contact area is insured by proportioning the height and thickness of the ribbon-like stream such that the height is greater than about three times the thickness of the stream, assuming the stream to be approximately rectangular in cross-section.

It is, therefore, a prime object of this invention to achieve in the main burner of a gas turbine a volumetric heat release rate significantly greater than the heat release rates achieved in present-day direct injection combustors.

It is another object of this invention to substantially reduce main combustor volume, and particularly, main combustor length in a gas turbine.

It is a further object of this invention to accurately meter the primary air flow to the main combustor units of a gas turbine to maintain a nearly stoichiometric primary fuel-air mixture ratio over the range of overall fuel-air ratios up to nearly stoichiometric fuel-air ratio.

It is still another object of this invention to provide a method of operating a main combustion system for gas turbines wherein operation is conducted with an excess of air and fuel-rich mixtures are avoided throughout the combustor volume.

It is still a further object of this invention to provide a mode of operation for the main combustor of a gas turbine wherein the primary air stream is maintained at high velocity at each fuel injection point and relied upon to atomize the fuel and to promote rapid mixing of fuel and air, and wherein to further promote rapid mixing fuel is introduced through a larger number of fuel injection points than is conventionally employed.

It is an additional object of this invention to provide in the aforementioned high velocity primary air stream means for introducing alternating contrarotating vortices into the flow, to speed the mixing of burned and unburned gas.

It is yet a further object of this invention to cause the secondary air to move in ribbon-like flow parallel to and interleaved with the primary mixture.

It is still a further object of this invention to employ the aforementioned ribbon-like flow of secondary air for cooling the turbine inlet nozzle partitions.

It is yet an additional object of this invention to employ the aforementioned ribbon-like flow of secondary air to cool the combustion products.

These and other objects are made possible by improved construction for the primary combustion of fuels in the combustion system of a power plant wherein means are provided for accurately metering the incoming primary air flow in relation to changes in the metered fuel inputs whereby a relatively constant equivalence ratio for the primary fuel-air mixture may be maintained, and wherein secondary air is isolated in ribbon-like flows parallel to and interleaved with the primary air-fuel mixture for controlled cooling of the turbine nozzle partitions and/or the combustion products.

Other objects and advantages will be apparent to those skilled in the art from consideration of the following description taken in connection with the accompanying drawings in which:

FIG. 5 is a sectional view similar to FIG. 1 taken along line 5—5 of FIG. 6 showing design variations for larger gas turbine units and for the alternate disposition of the secondary air;

FIG. 6 is a sectional view taken along line 6—6 of FIG. 5;

Figure 1:
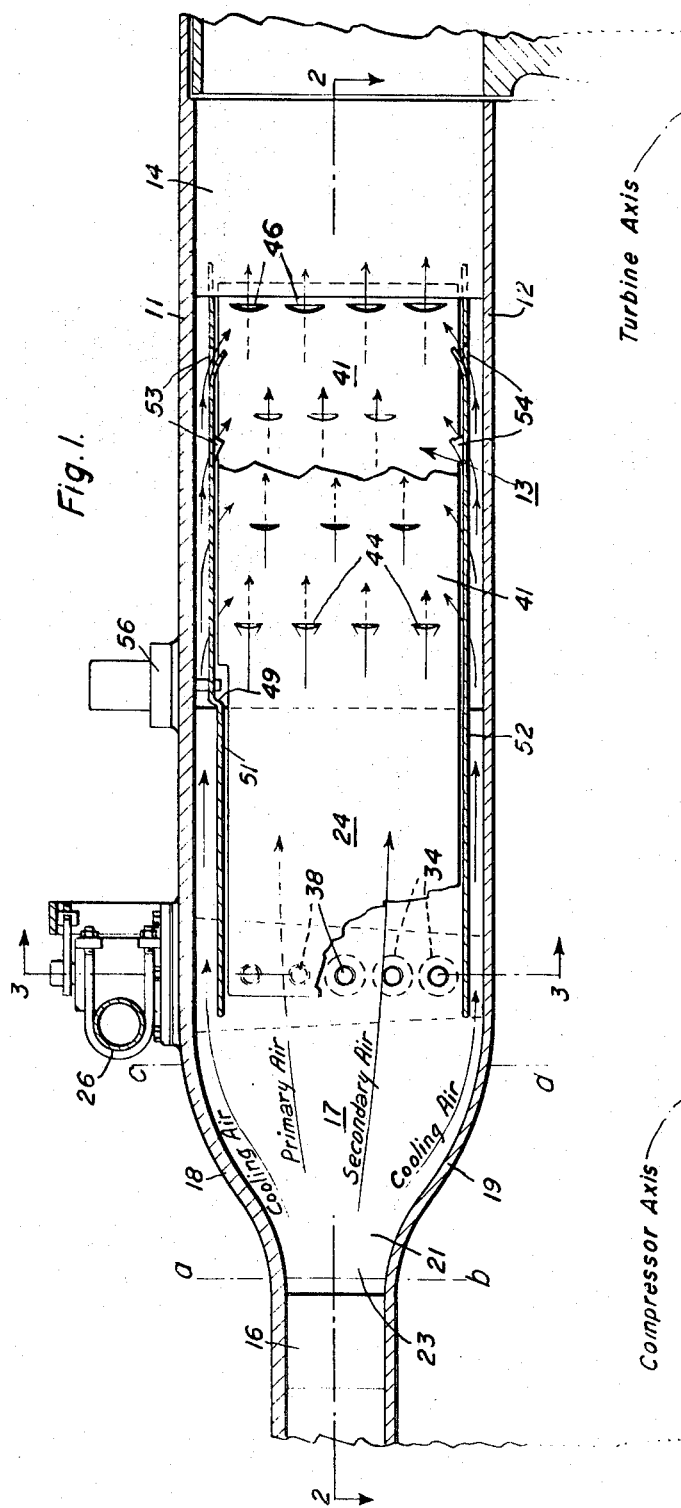
FIG. 1 is a longitudinal sectional view (section on line 1—1 of FIG. 2) of a main combustor for a gas turbine employing the preferred embodiment of this invention.

As is shown in FIG. 1, casing walls 11, 12 define the annular combustion chamber 13, which is utilized to supply hot gases for operating the turbine indicated by turbine nozzle partitions 14. The compressed air discharged from the outlet guide vanes 16 of the compressor, the axis of which coincides with the axis of the turbine, passes through the short transition zones 17 each of which is defined by curved casing wall portions 18, 19 and the walls 21, 22 of struts 23. The configurations of these confining walls is designed to conduct the outgoing air flow from the compressor guide vanes 16 at constant velocity into the combustion chamber 13. During this passage from the compressor the air flow is split (by wedge-like flow splitters 24) into radially extending sheet-like streams comprising a secondary air stream interposed between a pair of primary air streams. Simultaneously therewith, fuel is mixed with the primary air streams in preparation for entry of the primary air-fuel mixture into the combustion zone 13. Thus, at one and the same time, as the radial height of the flow passage 17 interconnecting the compressor and the main combustor 13 is expanded to provide the additional volume to offset the volume occupied by the flow splitting structure and to compensate for the expansion of the gases during combustion (note the increase in radial dimension from line a–b to line c–d), the passage 17 is contracted in the circumferential dimension by the configuration of walls 21, 22 of adjacent struts 23. In this manner, the cross-sectional flow area and velocity, are held constant.

Figure 2:
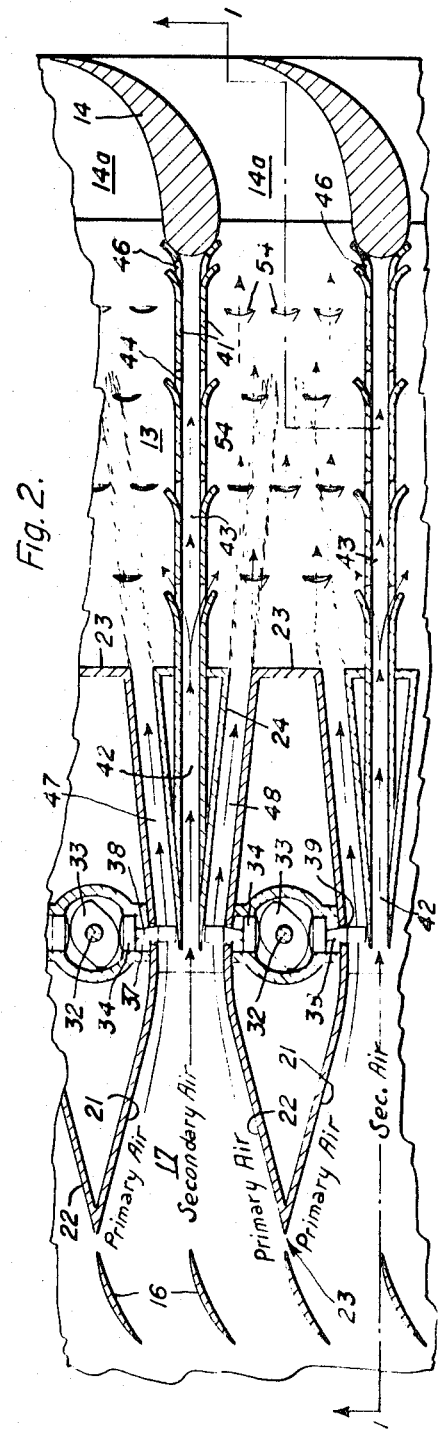
FIG. 2 is a sectional view taken along line 2—2 of FIG. 1.
Figure 3:
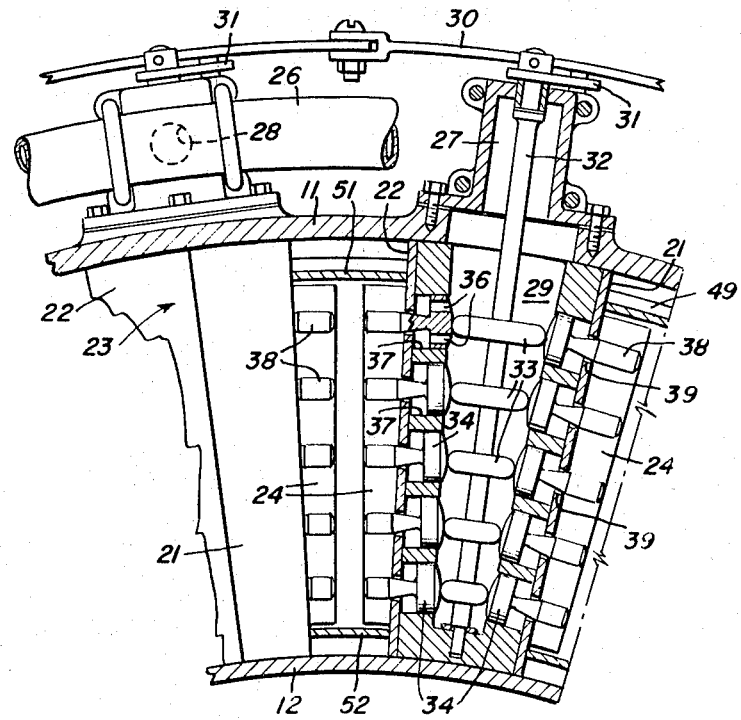
FIG. 3 is a sectional view taken along line 3—3 of FIG. 1 to show in detail the actuating mechanism for accurately metering the incoming primary air flow in relation to the metered fuel input.
Figure 4:
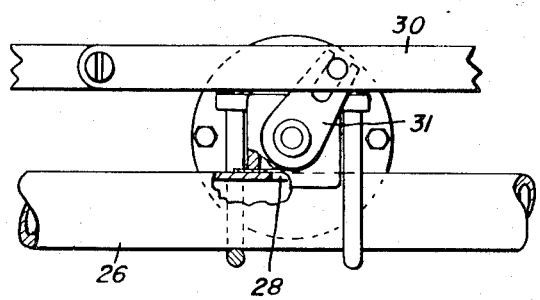
FIG. 4 is a detailed view of the mechanism for the cam actuation.

The fuel is injected into each primary air stream from the adjacent strut 23. The length of splitters 24 is, therefore, determined by the distance required for the effective mixing of the fuel with the primary air. From fuel supply manifold 26, fuel passes under pressure to chamber 27 via opening 28. Chamber 27 is in communication with fuel distribution station 29 wherein the mechanical system for metering fuel input and for actuating and positioning splitters 24 is housed. Hydraulically actuated means could, of course, be employed, but the mechanical device is preferred. As may be seen, the addition of fuel is accomplished in direct relationship to the positioning of splitters 24. Thus, control of the amount of fuel introduced to the primary air streams is accomplished by the movement (as by a main fuel control, or throttle, not shown) of adjusting girt 30 consisting of a series of connecting links, whereby crank 31 is rotated counter-clockwise or clockwise as desired. Rotation of crank 31 causes rotation of cam rod 32 on which are mounted cams 33. These cams 33 are similar in shape, but differ in size to compensate for the locations thereof at various radial distances from the turbine axis. Each of cams 33 has its opposite faces in contact with a pair of pistons 34 through which extend fuel passages 36. Pistons 34 are adapted to reciprocate in cylinders 37 whereby the tapered portions of valve stems 38 are moved to specific positions relative to atomizing fuel orifices 39. At the same time, the positioning of valve stems 38 determines the distance splitters 24 (against which they bear) are moved away from the sides of struts 23, thereby determining the quantity of incoming compressed air that functions as primary air, and that quantity of incoming compressed air which becomes secondary air as is illustrated in FIG. 2. A single properly shaped tapered cam could be substituted for the plurality of cams shown, if desired, as long as all valve stems 38 are simultaneously moved the same distance to insure substantially parallel movement of the forward edges of splitters 24 toward or away from each other.

Splitters 24 are necessarily biased away from each other by the higher pressure conditions prevailing in the secondary air stream. However, if desired, mechanical means for biasing pistons 34 inwardly of cylinders 37 may be provided as well.

As may be determined by the disposition of the taper on valve stem 38, with the arrangement shown, any increase in fuel injection into the primary air stream simultaneously effects a comparable increase in the quantity of primary air by repositioning of splitters 24, which are affixed to the turbine nozzle partitions 14 by means of flexible partitions 41 welded to turbine nozzle partitions 14. If desired, these two functions (fuel metering and primary air metering) may be exercised by separate but coordinated mechanisms.

That portion of the air flow entering between flow splitters 24 moves downstream along channel 42 and thence between partitions 41 defining channels 43. At any desired number of stations along channel 43, louvers 44 may be located to permit the egress of secondary air from channel 43 for film cooling of walls 41. The amount of exiting secondary air, which is at a higher pressure, is controlled by the size(s) of louvers 44. Louvers 46, which are larger than louvers 44, allow the exit of the greatest quantity of secondary air to insure adequate cooling of the surfaces of turbine nozzle partition 14. In this manner any hot streaks in the burned gas are aimed at the passages 14a between partitions 14. As an alternate construction hollow partitions 14 in communication with passage 43 may be employed with film-cooling holes in their surfaces.

The primary air-fuel mixture exits from channels 47, 48 and become ignited as it moves downstream past flameholder regions provided by the downstream ends of struts 23 and splitters 24 as contact with the burned gases becomes effective for heating up the primary mixture. It has been determined that when near stoichiometric primary mixtures are used, the blunt downstream ends of struts 23 and splitters 24 need not be large in area to afford significant flame stabilization. Cross-firing between flameholder regions to light one such region from an adjacent region is very effectively provided by the introduction of small circumferentially extending flame-holding step 49 formed in liner 51, which (like liner 52 spaced from casing wall 12) is mounted spaced from casing wall 11. Liners 49, 51 located either by means of studs (not shown) or by attachment to struts 23 cooperate with the adjacent casing walls to provide passageways for cooling air from transition zones 17 for walls 11 and 12. After cooling the casing walls 11, 12 these air flows enter the combustor 13 via louvers 53, 54. Ignition of flame-holding step 49 is accomplished by spark plugs, such as spark plug 56, located at suitable intervals. As indicated hereinabove by enabling the use of a stoichiometric mixture during operation in accordance with the process of this invention, neither the step 49 nor the spark output from plug 56 need be large.

Operation of the combustion system of this invention, therefore, includes compressing air for the combustion process in the usual manner and then conducting the compressed air at substantially constant velocity to the flameholder loci, rather than diffusing and re-accelerating the flow as in the devices known heretofore. On the way the flow is split circumferentially into primary and secondary streams. The primary air flow is accurately metered and primary air and fuel flow are co-ordinated. The fuel is thoroughly and rapidly atomized and mixed in and by the high velocity primary air stream along the way. The primary mixture proceeds downstream, mixes with burned gases and is ignited at the flameholders. Thereafter, secondary air is mixed therewith to the extent desired depending on the length of flexible walls 41. In the preferred mode of operation the mixing of secondary air with burned gas is suppressed to supply substantial cooling fluid to the turbine nozzle partitions.

Thus, the air velocity at the outlet vanes 16 would typically be about 250 feet/second and would remain nearly constant over the operating range, which could be expected to see the mass flow increase by a factor of seven, the absolute temperature by a factor of two and the pressure by a factor of thirteen between idle and full speed. Flames can readily be stabilized at this velocity. Control of splitter 24 must be precise, but the fluid flow through distribution station 29 serves as coolant and lubricant for the metering apparatus contained therein. Heat conduction to each entire strut 23, assuming its surface to be at 500° F. and the air stream at 1000° F. amounts to 150 B.t.u. per pound of fuel, which is enough heat energy to heat the fuel by 250° F. or to boil it, but not both insuring, therefore, that some liquid fuel will be available for cooling and lubrication.

In order to obtain proper atomization of the fuel for ground starts, particularly in cold weather, it may be necessary to preheat the fuel supplied to the vicinity of spark plugs 56 or to provide a separate pressure atomized starting fuel system (not shown).

In large combustors it may be desirable to install circumferentially-extending vanes 61, 62 connected between struts 63 to turn the air sharply as shown in FIG. 5 and thereby enable the use of a much shorter flow passage 64, proportionately, than that shown in FIG. 1. The modified construction shown in FIGS. 5, 6, 7, 8 and 9 illustrates the use of a shortened flexible wall 66 welded, or otherwise affixed, at its downstream end to casing liners 67 and 68. Movement of the forward end of each splitter 69 is enabled, because of the flexible nature of wall 66. Other means, such as pivoting means, could be employed to support each wall 66 to allow adjustment. Shortening of the walls 66 promotes the early mixing of the ribbon of secondary air with the burned gas to produce a combustor discharge of substantially uniform temperature. Also shown is the use of scalloped flameholders to produce alternating vortices to increase the mixing rate of incoming primary mixture with burned gases.

Figure 7:
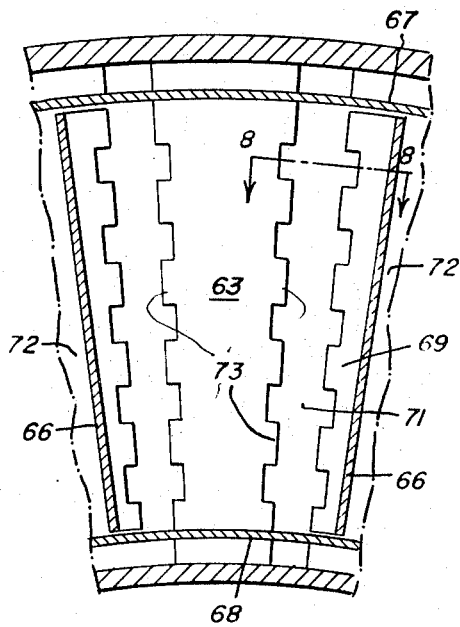
FIG. 7 is an elevational view taken on line 7—7 of FIG. 6 to show a modified construction for the downstream ends of struts and splitters to increase the mixing rate between the primary air-fuel mixture and the burning gases.
Figure 8:
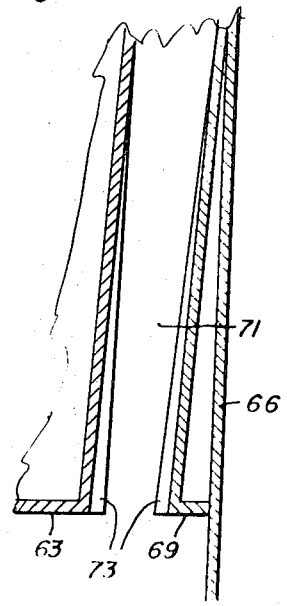
FIG. 8 is a section taken on line 8—8 of FIG. 7.
Figure 9:
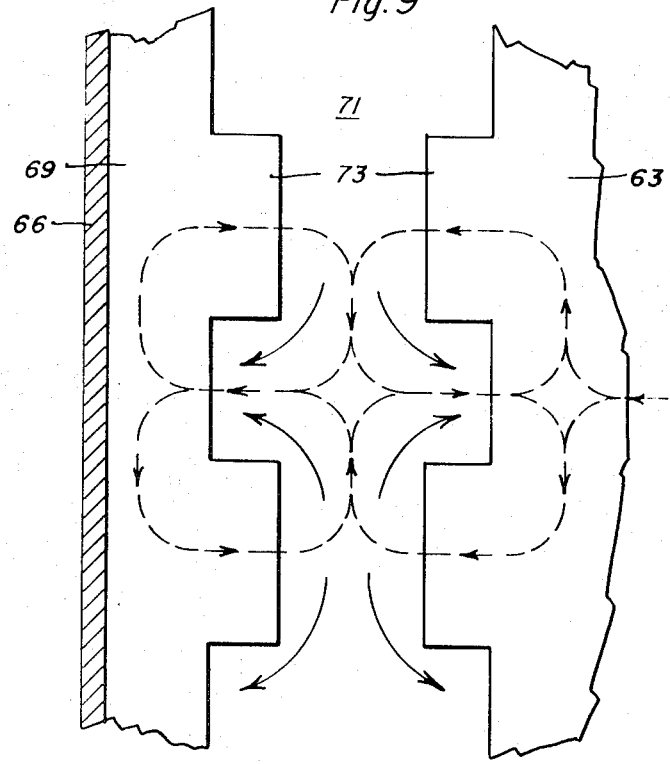
FIG. 9 is an enlarged detailed view schematically representing the flow pattern of alternating vortices produced with the construction of FIG. 7.

Details of the modified flameholders are shown in FIGS. 7, 8 and 9. FIG. 7 is taken on line 7—7 of FIG. 6 facing upstream of primary air passageways 71 and secondary air passages 72 toward the blunt ends of struts 63 and splitters 69. As shown, the rear edges of struts 63 and splitters 69 are provided with projections 73 extending into the flow passageways 71. Viewed in plan (FIG. 8) these projections are wedge-like in shape providing alternating constriction and expansions in passageways 71 along the radial dimension. The effect of these projections 73 is shown in the schematic flow pattern in FIG. 9. Vortices of flow are produced by the adjacent lands and valley in the cold (primary mixture) flow as shown by the solid arrows and these sweeps of cold flow produce coherent induced flows (shown by dotted lines) which transport unburned gas into the wake and burned gas into the free stream. In this manner more rapid mixing of primary mixture and burned gases occurs such that combustion is initiated and completed in a shorter downstream distance. This same use of paired vortices can be applied to advantage at the downstream ends of walls 66 to increase the rate of mixing between the secondary air and the burned gases.

Therefore, both apparatuses and processes to be conducted therein for more efficiently effecting heat release reactions for the controlled production of power have been disclosed. The principles of this invention have been illustrated in connection with the main combustion system of a gas turbine power plant. However, this invention is applicable broadly to high intensity combustion units using liquid or gaseous fuels.

Obviously many structural modifications and variations of this invention are possible in the light of the teachings set forth herein. It is, therefore, to be understood, that within the scope of the appended claims, the invention may be practiced otherwise than as specifically described.

What I claim as new and desire to secure by Letters Patent of the United States is:

1. In a power plant wherein air to support internal combustion in a combustion chamber is taken into a compressor; compressed and passed on to a combustion chamber; mixed with fuel; ignited and burned in said combustion chamber, and the combustion products conducted to a turbine for the production of power, the improvement comprising:
   (a) maintaining the combustion air flow at a substantially constant high velocity in transit from the compressor to the combustion chamber,
   (b) separating the combustion air flow into a plurality of parallel interleaved streams of primary air and secondary air prior to admission to said combustion chamber,
   (c) adding controlled amounts of fuel to each of the high velocity primary air streams, and
   (d) simultaneously automatically controlling the amount of air in the primary air streams in inverse relation to the amount of air in the secondary air streams as a function of the amount of fuel being added;
whereby a relatively constant primary equivalence ratio may be maintained for the primary air-fuel mixture delivered to said combustion chamber over the range of overall fuel-air ratios to the stoichiometric fuel-air ratio.

2. The improvement substantially as recited in claim 1 wherein the streams of secondary air have a height-to-thickness ratio of at least about three before admission thereof to the combustion chamber.

3. The improved method substantially as recited in claim 1 wherein operation is conducted with the primary air flow being between 5 and 15 percent in excess of the stoichiometric amount.

4. The improved method substantially as recited in claim 1 wherein the equivalence ratio of the primary air-fuel mixture is in the range of from 0.7 to 1.3.

5. In a combustion system wherein air for supporting internal combustion in a combustion chamber is taken into a compressor; compressed and conducted through passage means to said combustion chamber; mixed with fuel, and ignited and burned in said combustion chamber, the improvement comprising:
   (a) adjustable means located in the passage means upstream of the combustion chamber for subdividing the compressed air for combustion into a large number of separate, parallel radially-extending ribbon-like streams having a height-to-thickness ratio of at least about three before admission thereof into the combustion chamber and
   (b) means for adjusting said subdividing means to alter the individual cross-sectional flow areas of said streams while maintaining substantially constant total flow area.

6. The improvement substantially as recited in claim 5 wherein means are provided for injecting fuel into fewer than the total number of separate streams of air.

7. The improvement substantially as recited in claim 6 wherein the fuel injection means are located so that one stream of air having fuel injected therein is disposed along either side of a stream of unaltered compressed air.

8. In a power plant wherein air to support internal combustion in a combustion chamber is taken into a compressor; compressed and passed on to a combustion chamber; mixed with fuel; ignited and burned in said combustion chamber, and the combustion products conducted to a turbine for the production of power, the improvement comprising:
   (a) passage means leading from the compressor outlet to the combustion chamber proportioned for delivering the compressed air output at substantially constant high velocity throughout the transit thereof,
   (b) adjustable means located in said passage means for dividing the combustion air into a plurality of first and second air streams upstream of said combustion chamber,
      said second air streams being interleaved with and parallel to said first air streams, and
   (c) co-ordinated means for adding controlled amounts of fuel at a large number of points into said first air streams and adjusting said dividing means for controlling the amount of air in each of said first streams in inverse relation to the amount of air in said second streams as a function of the amount of fuel added, the total area for air flow remaining substantially constant.

9. The improvement substantially as recited in claim 8 wherein the flow areas for said second air streams each have a height-to-thickness ratio of at least about three.

10. The improvement substantially as recited in claim 9 wherein the means for adding controlled amounts of fuel is adapted to position the means for dividing the combustion air.

11. A power plant comprising in combination:
   (a) a compressor having an annular outlet for fluid compressed therein,
   (b) a combustion chamber spaced therefrom,
   (c) annular passage means placing said annular outlet in communication with said combustion chamber,
   (d) aerodynamically-shaped struts located in and extending across said passage means at spaced positions to separate fluid flow therethrough into separate circumferentially-disposed conduits,
      said conduits each having simultaneously decreasing circumferential and increasing radial dimensions in the downstream direction providing substantially constant flow area at successive downstream stations,
   (e) adjustable means disposed substantially parallel to each other extending in the general radial direction across the span of said conduits for dividing fluid flow through each conduit into a plurality of first and second flow streams,
   (f) means for controlling the position of said dividing means to determine the relative cross-sectional areas in said first and second flow streams,
   (g) means for controlled fuel injection located in communication with a plurality of regions defined at least in part by said dividing means,
      said combustion chamber having located at the the upstream end thereof the blunt ends of said struts and said dividing means,
   (h) ignition means in said combustion chamber, and
   (i) a turbine in communication with said combustion chamber.

12. A power plant substantially as recited in claim 11 including means located in the combustion chamber for defining discrete flow passageways extending through the interior of said combustion chamber, said defining means being in communication at the upstream end thereof with certain of the regions defined at least in part by the dividing means, whereby fluid flow through said certain regions may be conducted undiluted through said combustion chamber to the nozzle partitions of the turbine.

13. A power plant substantially as recited in claim 11 wherein the dividing means determine separate cross-sectional areas of flow having height-to-width ratios of at least about three.

14. A power plant substantially as recited in claim 11 wherein the means for controlling the position of the dividing means and the means for controlled fuel injection are simultaneously actuated.

References Cited

UNITED STATES PATENTS

| | | | |
|---|---|---|---|
| 1,052,588 | 2/1913 | Janicki | 60—39.27 |
| 2,457,157 | 12/1948 | King, Jr. | 60—39.23 |
| 3,316,714 | 5/1967 | Smith et al. | 60—39.65 |

SAMUEL FEINBERG, Primary Examiner

U.S. Cl. X.R.

60—39.23, 39.27, 39.65, 39.74